United States Patent [19]
Boons

[11] Patent Number: 5,493,206
[45] Date of Patent: Feb. 20, 1996

[54] METHOD AND APPARATUS FOR DETERMINING A GROUP TO WHICH A CONNECTION POINT FORMING PART OF AN ELECTRICAL INSTALLATION BELONGS

[76] Inventor: Cornelis D. Boons, Wildemanstraat 38, Oisterwijk, Netherlands, NL-5062 HB

[21] Appl. No.: 122,470
[22] PCT Filed: Mar. 16, 1992
[86] PCT No.: PCT/NL92/00052
 § 371 Date: Sep. 29, 1993
 § 102(e) Date: Sep. 29, 1993
[87] PCT Pub. No.: WO92/17926
 PCT Pub. Date: Oct. 15, 1992

[30] Foreign Application Priority Data

Apr. 2, 1991 [NL] Netherlands ............... 9100570

[51] Int. Cl.$^6$ ............... G01R 31/02; G01R 31/08
[52] U.S. Cl. ............... 324/66; 324/67; 324/527; 324/542
[58] Field of Search ............... 324/66, 67, 508, 324/527, 539, 555, 556, 540, 523, 542; 379/25, 26

[56] References Cited

U.S. PATENT DOCUMENTS 4,578,636  3/1986  Bakke et al. ............... 324/66
4,906,938  3/1990  Konopka ............... 324/529
5,029,274  7/1991  Goff et al. ............... 324/66

OTHER PUBLICATIONS

Jose G. Bulatao, European Patent Application, Sep. 1983, Publication No. 0088163A1.

Primary Examiner—Sandra L. O'Shea
Assistant Examiner—Jay M. Patidar
Attorney, Agent, or Firm—Evenson, McKeown, Edwards & Lenahan

[57] ABSTRACT

A method is provided for determining to which group a connection point forming part of an electrical installation belongs, wherein the electrical installation is divided into at least two groups. For this purpose, use is preferably made of a device including a detecting and measuring device which has a number of detection units. The number is at least equal to the number of groups forming part of the installation. Each detecting unit is provided with a detector for detecting the group in which the signal applied at the connection point is detected. The detecting and measuring device is provided with a transmitter for transmitting a designation of the group in which the signal is detected. An indicating device has a receiver for the signal transmitted by the transmitter and has an indicator for indicating a designation of the group in which the signal is detected.

18 Claims, 2 Drawing Sheets

METHOD AND APPARATUS FOR DETERMINING A GROUP TO WHICH A CONNECTION POINT FORMING PART OF AN ELECTRICAL INSTALLATION BELONGS

BACKGROUND AND SUMMARY OF THE INVENTION

The present invention relates to a method for determining to which group a connection point forming part of an electrical installation belongs, wherein the electrical installation is divided into at least two groups, which are each connected to a distribution network via a fuse.

Such a method is generally known. Such a method must be applied when work has to be carried out for example in an older electrical installation, the configuration and the group arrangement of which is unknown, or when it is desired to have a correct diagram of the installation, possibly by order of the electricity board.

According to the method known up to the present, which must be performed by at least two persons, the group switches are switched off and on one by one by one person, while the other person verifies whether the voltage is cut off at the connection point being inspected. When the voltage is cut off, which is established by extinguishing of the lamps or a control lamp temporarily connected to the wall socket, a verbal message is passed to the first person at the meter panel. This person determines to which group the relevant connection point is connected and makes an appropriate note.

It will be apparent that this is a laborious and time-consuming procedure for which two workers are required. The chance of errors is also considerable, partly due to the verbal communication. While it is true that it is possible for one person to perform this method, this one person must then walk back and forth a great deal, which consumes a very great amount of time (considerably more than double).

The object of the present invention is to provide a method which can be performed in a shorter time and by only one person. The object of the present invention is likewise to provide a device which can be used in performing such a method.

This object is achieved by:

applying a signal at the connection point which is detectable at the location of the fuse;

detecting the current flowing at the location of each fuse forming part of the installation; and transmitting to the user via an electrical indication signal the designation of the group in which a signal is detected.

The present invention also provides a device for determining to which group a connection point forming part of an electrical installation belongs, wherein the electrical installation comprises at least two groups, which are each connected to a distribution network via a fuse, wherein the device comprises:

a detecting and measuring device which comprises a number of detection units, which number is at least equal to the number of groups forming part of the installation and wherein each detecting unit is provided with a detector for detecting the group, in which the signal applied at the connection point is detected, and wherein the detecting and measuring device is provided with a transmitter for transmitting an indication signal which indicates the group in which the signal is detected; and an indicating device which is provided with a receiver for the indication signal transmitted by the transmitter and with indicating means for indicating a designation of the group in which the signal is detected.

In the above stated method wherein the above mentioned device is preferably applied, it becomes possible for only one person to record the complete group arrangement of an electrical installation, wherein only one person is required and wherein the one person applies at the connection points the signals which are detected at the meter panel and wherein a feedback is made automatically to the person recording as to which group the connection point belongs at which the signal is applied. Time saving of a factor of four can be obtained by the method according to the present invention.

BRIEF DESCRIPTION OF THE DRAWINGS

The present invention will subsequently be elucidated with reference to the annexed figures, in which.

DETAILED DESCRIPTION OF THE DRAWINGS

Figure 1:
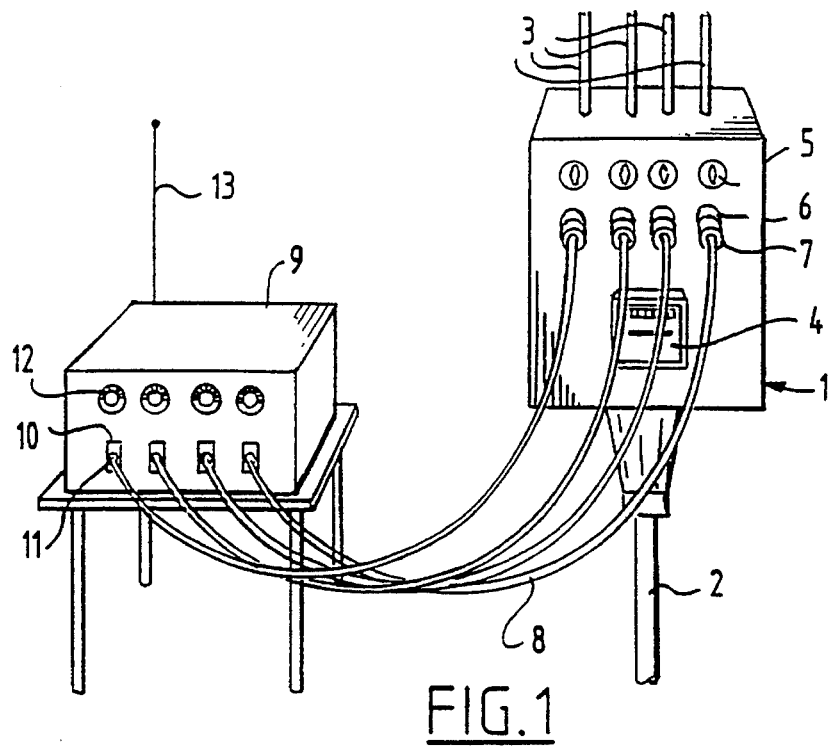
FIG. 1 shows a schematic perspective view of a meter panel of an electrical installation to which is connected a detecting and measuring device according to the present invention.

Shown in FIG. 1 is a meter panel 1 which is connected via a cable 2 to the mains distribution network. Four conduits 3 are arranged emerging from the top of the panel 1. Each of these conduits 3 feeds a group of connection points forming part of the electrical installation. These connection points can be formed by socket outlets, light points or fixedly connected appliances. The meter panel 1 further comprises a kWh meter 4 which measures the total energy flowing through the cable 2. A main switch 5 is further arranged for each of the groups and a holder 6 is likewise arranged for each of the groups for arranging screw fuses therein.

Other components are often arranged in such panels, such as extra main switches and earth leakage switches. Since such components do not fulfil any function in the present invention they are not further indicated.

For performing the method according to the invention the screw fuses normally present in each of the holders 6 are removed and arranged in place thereof are connecting members 7 which are each connected via a cable 8 to a measuring and detecting device 9 disposed in the vicinity of the meter panel 1. Arranged for this purpose on one side of the measuring and detecting device 9 are socket outlets 10 to which the cables 8 can be connected by means of plugs 11.

The measuring and detecting device 9 also comprises a number of current adjusting members 12 the operation of which will be explained hereinafter. Finally, the measuring and detecting device 9 is provided with an aerial 13 which can otherwise also be arranged in the housing of the measuring and detecting device.

The embodiment above relates to four different groups. It is of course possible to employ measuring and detecting devices for more than four groups or to make use of more than one measuring and detecting device. Essential is that at least the same number of measuring and detection units must be present as the number of groups. In principle it is possible to work with more measuring and detecting devices than the total number of groups, but then the measuring has to be repeated for the other groups and the connection points which are not assigned to a group at the first measuring.

Figure 2:
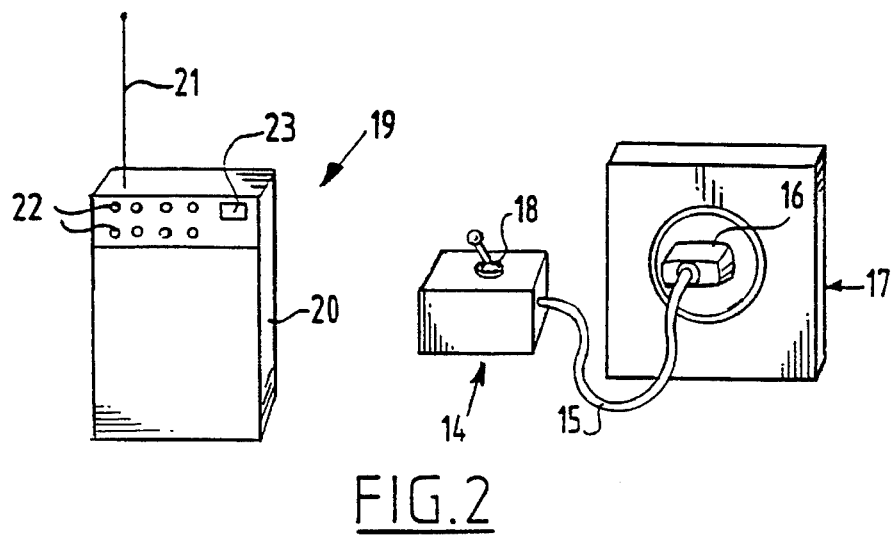
FIG. 2 shows a schematic perspective view of an indicating device according to the invention and a load connected to a wall socket, both of which devices can be operated by the user.

When performing the method according to the invention use is made of a switchable load. Such a load 14 is shown in FIG. 2. This is formed by a box in which an electrical resistance or other load is incorporated. This can be connected to a wall socket 17 by means of a lead 15 and a plug 16. Further arranged on the load 14 is a switch 18 with which the load can be switched on and off.

FIG. 2 shows an indicating device 19 used with the invention. This indicating device 19 is formed by a housing 20 which is provided with an aerial 21 and on which a number of indicator lamps 22 are arranged. A meter 23 is further arranged for indicating the strength of the signal received via the aerial 21. Beneath the indicator lamps 22 a surface is kept free on which a piece of paper can be arranged on which notes can be made during recording of the installation. It is also possible to embody the indicating device so compactly that there is only room for the indicator lamps of the meter. Alpha-numerical displays can also be used instead of indicator lamps. A reset button can be arranged on the housing to extinguish the indicator lamps.

Subsequently, the applied method will be further elucidated:

Assuming an electrical installation in operation, the measuring and detecting device 9 is disposed in the vicinity of the meter panel 1 of the installation. The fuses present in the meter panel 1 are subsequently removed, wherein the connecting members 7 are connected in place thereof, wherein these are connected beforehand to the measuring and detecting device 9 by means of the respective cables 8, the plugs 11 and the socket outlets 10, so that the current supply is only interrupted for a short time.

It will be apparent that in order to record the group arrangement in an effective manner the number of separate group connections forming part of the measuring and detecting device must be greater than or equal to the number of groups forming part of the electrical installation. In some cases it is therefore necessary to employ more than one measuring and detecting device 9. It is otherwise not absolutely necessary for the number of group connections to be larger than the number of groups. In that case the measuring will have to be repeated with the remaining groups, which however demands extra time.

When the measuring and detecting device 9 is thus connected the sensitivity of the current value adjusting means 12 must be adjusted. Use is made herein of the indicating device 19. The relevant button 12 is then turned until the corresponding indicator lamp 22 on the indicating device 19 just does not illuminate. It is also possible to provide the measuring and detecting device with appropriate indicator lamps.

This means that the current picked up by the group in question differs only slightly from the current adjusted by means of the current value adjusting means. Any change in current that may occur can then also be detected easily.

This operation is performed for all the groups.

The actual recording of the group arrangement can then be initiated. For this purpose the user makes use of the changeable load 14. This load 14 is successively connected to all the connection points forming part of the installation, wherein the load is varied using the switch 18. As a result of this varying load a change of current will occur in one of the groups, and this will be in the group to which the relevant load is connected.

This current change will be detected by the measuring and detecting device 9 and the relevant designation of the group will be passed via a transmitter arranged in the measuring and detecting device 9 via the aerial 13 to the aerial of the indicating device 19. The user carries this indicating device with him and with reference to the illuminated indicator lamp 22 can determine in which of the groups a current change has taken place. This group is then the group to which the relevant connection point is connected. The user can then make an appropriate note, for example on the piece of paper which he has fixed on the indicating device 19 for this purpose.

When determining to which group a fixedly arranged light point is connected, the operation proceeds in similar manner; for this purpose the lamp is switched on, should it be turned off, whereafter it is established in which group a current increase has taken place.

Figure 3:
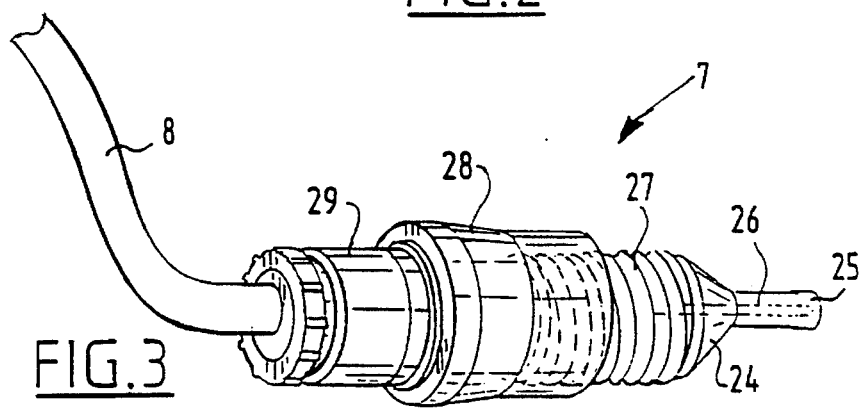
FIG. 3 is a schematic view of a connecting member that is suitable for placing in the fuse holder of a meter panel.

FIG. 3 forms an illustration of a connecting member which can be screwed into the holder intended for this purpose instead of the usual fuse. The holder 7 is formed by a body 24 manufactured from insulating material, the shape of which substantially corresponds with that of a normal fuse. Arranged on the point hereof is a conducting cap 25 which is connected to one of the cores of the cable 8 via a wire connection 26 extending through the center of the body. The cable can be at least a two core cable. Arranged around the body is a sleeve 27 which is manufactured of metal, provided with a screw thread and connected to the other core of the cable 8.

The sleeve 27 is fixedly connected to a sheath 28 made of insulating material, using which the sleeve 27 can be rotated relative to the body 24 so that the whole connecting member 7 can be screwed into a holder. To connect the cable 8 to the body 24 use is made of a sleeve nut 29. It will be apparent that use must be made of different metal sleeves 27 to accommodate different sizes of holders in respect of the diverse values of current for which the fuse is suitable.

There are situations in which such connecting members cannot be used. Such a situation occurs for example when automatic circuit breakers are used instead of fuses. Use is then made of so-called current sensors which have to be arranged around one of the conductors of a group connection. Several conductors will usually have to be exposed for this purpose. The current sensor otherwise also functions as a current transformer 30 so that the current sensor can be directly connected to the detection circuit. The fuse is not necessary; the automatic circuit breaker remains in operation.

Figure 4:
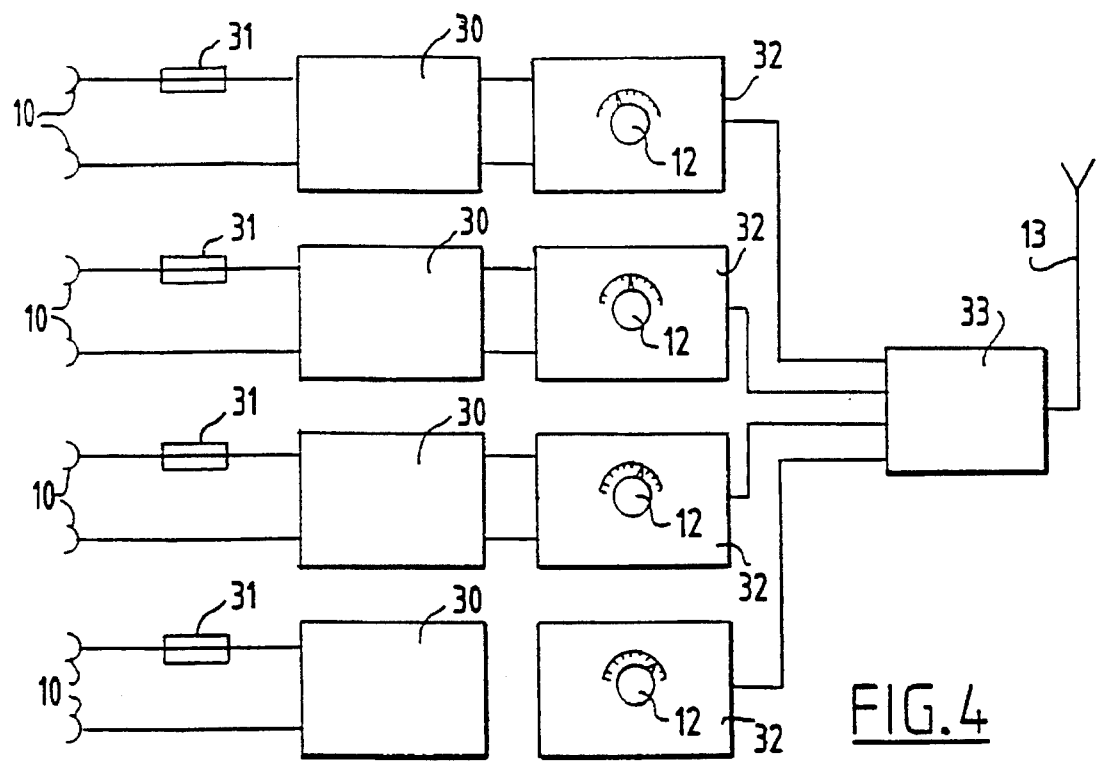
FIG. 4 shows a block diagram of a detecting and measuring device according to the present invention.

FIG. 4 shows a block diagram of a measuring and detecting device 9. The measuring and detecting device 9 is provided with four detection unit, each formed by a current transformer 30, the primary winding of which is connected to the socket outlets 10. A fuse 31 is received in one of the connections present therebetween. This takes into account the fact that the fuse must be removed from the meter panel 1 when the measuring and detecting device 9 is connected. An alternative form of fuse must therefore be used to prevent unsafe situations.

The secondary winding of the current transformer 30 is connected to the current change indicator circuit 32. As has already been described in the method, a limit value for the current is set using the adjustment buttons 12 of the current change indicator circuits 32 and the circuits 32 generate a signal to an outlet connection when the current supplied via the current transformer 30 to the circuit 32 is greater than the set limit value. The current change indicator circuit can be formed by a comparator circuit wherein one input connection is connected to the current measuring circuit and the other input connection is connected to an adjustable voltage or current source.

All the outlet connections of the relevant current change indicator circuits 32 are connected to a transmitter 33. The transmitter 33 transmits via the aerial 13 a signal with a frequency in the MHz range that is an indication for the designation of the current change indicator circuit on which a current change is indicated.

Figure 5:
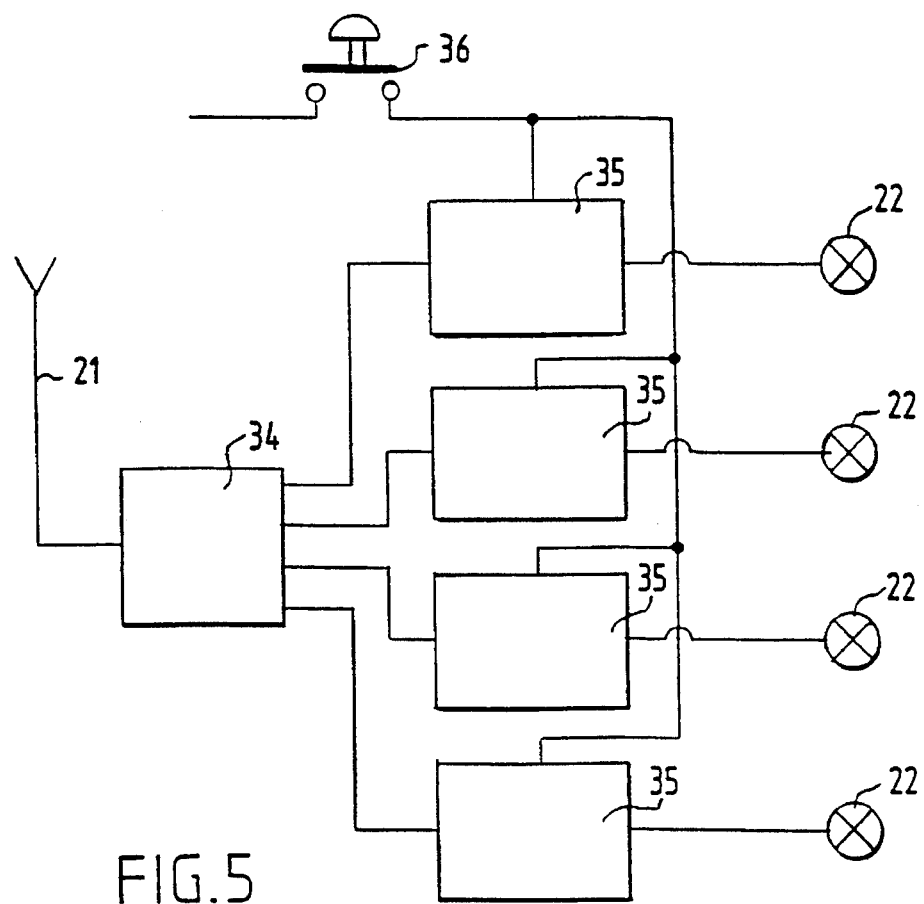
FIG. 5 shows a block diagram of an indicating device according to the present invention.

The circuit of the indicating device 19 is shown in FIG. 5. The signal received via the aerial 21 is fed to a receiver 34 wherein, subject to the signal, a signal is fed to one of the hold circuits 35. The signal received via the aerial 21 herein gives the designation of the current change indication circuit 32, on which a change has occurred, so that the relevant hold circuit 35 changes position. The indicator lamps 22 connected to the relevant hold circuit 35 will then be illuminated. When the measurement of the relevant connection point is complete the reset button 36 can be pressed whereby all the hold circuits are returned to their original position and the relevant indicator lamps 22 are extinguished.

An indication is thus obtained of the group in which a current change is detected.

What is entailed in the above embodiment is the applying of a load increase. In practice this will be an attractive embodiment. It is also possible to have the device operate with a load reduction. The operation is then reversed. This is attractive for example when a lamp is illuminated in a room and switching off can be detected. This is attractive particularly in combination with the first embodiment. There is then a reaction both to load reductions and increases. The invention is not however limited thereto; it is indeed also possible to apply for instance a high frequency signal at the relevant socket outlet, which signal can be detected at the meter panel. The frequency of this signal must not be too high however to prevent transfer via radiation. The signal must then also be prevented, by means for instance of a filter, from reaching the other groups via the main connection.

The embodiment above further relates to signal transfer from the detecting device to the indicating device by means of a transmitter and a receiver; other means can also be used for this purpose, such as a cable.

It is likewise possible to have this signal transfer take place via the installation. A high frequency signal is then necessary for this purpose which is applied to the installation at the meter panel and which can be picked up at the indicating device via a wall socket. In such an embodiment the function of changeable load can be recorded in the indicating device.

It is also possible of course to apply the method according to the present invention in reverse manner. A signal is then fed to one of the groups via the meter panel and a check is made as to whether this signal is detected at a particular connection point the group of which requires to be determined. The supplied signal will then usually be formed by switching off and on the circuit for the group, whereafter a check is made at the relevant connection point as to whether or not the voltage is briefly cut off. Disappearing of the voltage can be detected by a voltmeter or—in the case of a light point—by a light meter. Other forms of measurement are conceivable, for example sound or vibration meters in the case for example of fixedly connected motors.

In order to return the thus generated signal to the meter panel where the user is present for operation of the switches, use is preferably made of a remote link. The components from which such a link is assembled are formed by an appropriate voltmeter or light meter, a detector connected thereto and a transmitter. The user has a receiver with him which is provided with an indicator which indicates whether a voltage interruption takes place at the relevant connection point.

In this method use can be made of a specific device.

According to a preferred embodiment use is however made of the measuring and detecting device according to a first embodiment of the invention. For this purpose the transmitter forming part hereof is provided with a separate outwardly embodied connection to which a voltage or light detecting device can be connected.

In operation, the user has the indicating device with him at the meter panel. When a brief voltage interruption is detected during actuation of one of the group switches, this interruption is made immediately visible to the user via the indicating device. Thus, the user can determine the group to which the connection point is connected.

I claim:

1. Device for a user to determine to which group a connection point forming part of an electrical installation belongs, wherein the installation comprises at least two groups, which are each connected to a distribution network at a meter panel, wherein the device comprises:

a signal applying device for applying a signal to the connection point;

a detecting and measuring device which comprises a number of detection units, which number is at least equal to the number of groups forming part of the installation and wherein each detecting unit is coupled to a separate one of said groups and detects the signal applied at the connection point if said connection point belongs to its respective group, and wherein the detecting and measuring device is provided with a transmitter for transmitting a designation of the group in which the signal is detected; and an indicating device which is provided with a receiver for receiving the signal transmitted by the transmitter and with indicating means for indicating the designation of the group in which the signal is detected.

2. Device as claimed in claim 1, wherein said at least two groups each include a fuse, and wherein each detecting unit includes current measuring means for measuring a current flowing at the location of each fuse and by current change detection means for establishing if the measured current changes more than a predetermined value.

3. Device as claimed in claim 2, wherein the current measuring means includes a current sensor directly connected to the current change detection means.

4. Device as claimed in claim 2, wherein the current measuring means includes a connecting member the shape of which is suitable for fixing into a holder for the fuse, and a current transformer having a primary winding which is connected to the holder by means of an at least two-core cable, and wherein secondary winding of the current transformer is connected to the current change detection means.

5. Device as claimed in claim 4, wherein an additional fuse is connected in series to the primary winding of the current transformer.

6. Device as claimed in claim 2, wherein the current change detection means includes a comparator circuit whereof one input connection is connected to the current measuring means and whereof other input connection is connected to an adjustable voltage or current source.

7. Device as claimed in claim 1, wherein the indicating device is provided with a main circuit for retaining the indication of the group in which the last current change has occurred.

8. Device as claimed in claim 1, wherein the signal applied at the connection point is a load change, said load change being a load increase.

9. Device as claimed in claim 1, wherein the detecting device comprises a light meter.

10. Device as claimed in claim 1, wherein the detecting and measuring device is provided with a connection for a device for detecting a voltage interruption.

11. Device for a user to determine to which group a connection point forming part of an electrical installation belongs, wherein the installation comprises at least two groups, which are each connected to a distribution network via a fuse, wherein the device comprises:

means for detecting a voltage interruption occurring at the connection point, and for transferring an indication signal which is indicative of a voltage interruption, said voltage interrupting detection means being coupled to the distribution network; and means for receiving the indication signal and for providing a relevant indication to the user.

12. Method for a user to determine to which group a connection point forming part of an electrical installation belongs, wherein the electrical installation is divided into at least two groups, which are each connected to a distribution network at a meter panel, wherein the method comprises:

applying a signal at a connection point;

detecting at location of the meter panel the applied signal on at least one of the groups; and transferring a signal indicating presence of the applied signal on said at least one group from a first place where it was detected to a second place where the signal was applied.

13. Method as claimed in claim 12, wherein said at least two groups each include a fuse, the method further comprising the following steps of:

applying at the connection point a signal which is detected at location of the fuse;

detecting current flowing at the location of each fuse forming part of the installation; and transmitting an electrical signal to the user, the electrical signal indicating to the user the designation of the group in which said signal is detected.

14. Method as claimed in claim 13, wherein the signal applied at the connection point is a load change.

15. Method as claimed in claim 14, wherein the load change is a load increase.

16. Method as claimed in claim 12, wherein the step of transferring is carried out over a wireless path.

17. Method for a user to determine to which group a connection point forming part of an electrical installation belongs, wherein the electrical installation is divided into at least two groups, which are each connected to a distribution network at a meter panel, wherein the method comprises:

applying a signal on one of the groups at location of the meter panel;

detecting at location of a connection point the applied signal on the connection point; and transferring a signal indicating presence of the applied signal on said one of the groups from a first place where it was detected to a second place where the signal was applied.

18. A method according to claim 17, wherein the step of applying a signal on one of the groups at the location of the meter panel further comprises the step of separately switching off one by one each of the groups such that a voltage interruption is detected at the connection point associated with one of the groups when the respective group is switched off; and wherein the transferring step further comprises the step of transferring a signal to the user indicating the detection of the voltage interruption at the connection point.

* * * * *